S. C. FREGOSO.
WHEEL.
APPLICATION FILED JAN. 30, 1912.

1,031,174.

Patented July 2, 1912

WITNESSES

INVENTOR
S. C. FREGOSO
BY
ATTORNEY

UNITED STATES PATENT OFFICE.

SEVERO CAMPO FREGOSO, OF HELENSBURGH, SCOTLAND.

WHEEL.

1,031,174.   Specification of Letters Patent.   Patented July 2, 1912.

Application filed January 30, 1912. Serial No. 674,305.

*To all whom it may concern:*

Be it known that I, SEVERO CAMPO FREGOSO, a subject of the King of Italy, and residing at Helensburgh, Dumbartonshire, Scotland, have invented a certain new and useful Improvement in Wheels, of which the following is a specification.

This invention has for its object to provide an improved construction of wheel applicable to each individual wheel of ordinary road vehicles as hereinafter particularly described and pointed out in the claim.

Figure 1:
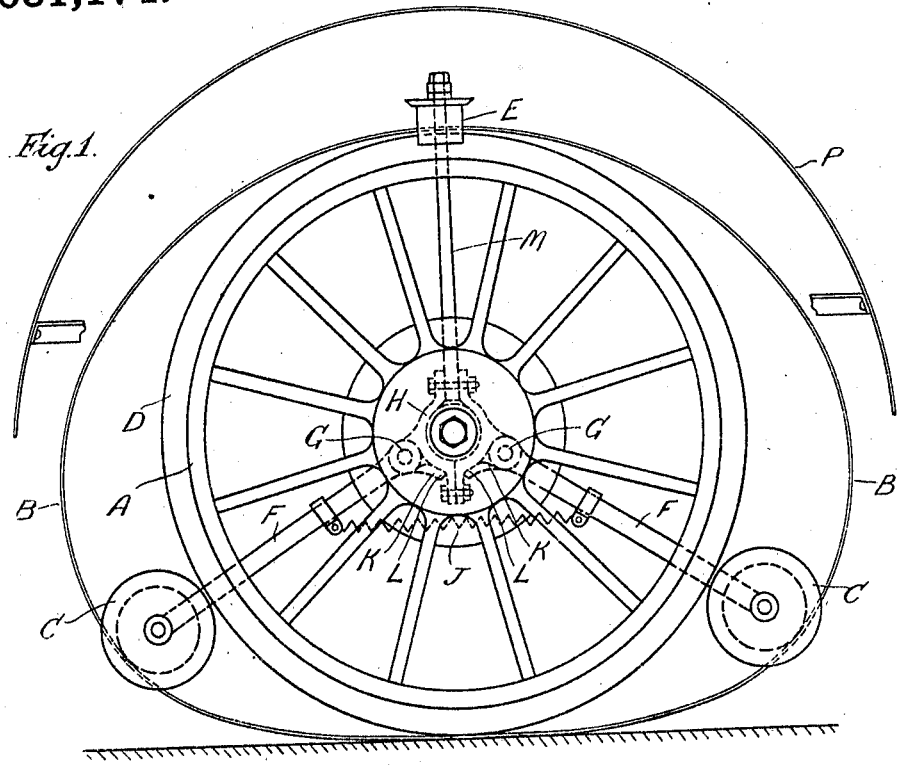
Figure 2:
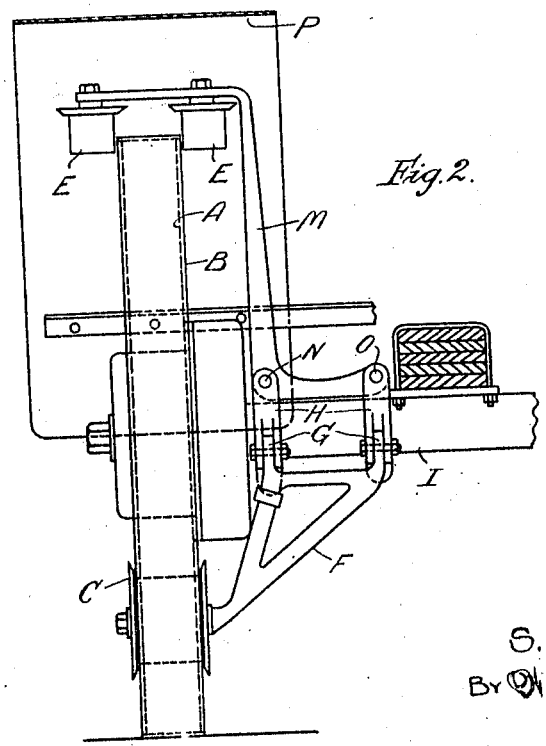

In the accompanying drawings Figures 1 and 2 are elevations at right angles to each other of a rear wheel of a motor road vehicle embodying the invention.

Referring to the drawings, the ground tread surface for the vehicle wheel A which may be provided with a solid rubber tire D, comprises a continuous band B of flexible material such as steel preferably formed to prevent skidding and provided if desired with an outer coating of rubber, said hoop or band surrounding said wheel, and being distended into approximately elliptical shape and slightly flattened on the ground by means of the plurality of guides formed for instance by two flanged pulleys or rollers C. The band B is maintained in position and in the plane of the wheel A by means of the said flanged rollers C and by a pair of vertical rollers E. The rollers C are rotatably mounted, within the area inclosed by said hoop or band, for example on brackets F which are pivoted at G on clamps H secured to the axle bearing I and are connected together by means of a spring J, stops K adapted to engage with one of said clamps, as at L, serving to limit the movement of the brackets F toward each other under the action of said spring J. As shown, the vertical rollers E are carried by a bracket M secured to the clamps H' at N and O. A mud guard P may be secured to the vehicle body in known manner.

It will be understood that during rotation of the vehicle wheel A the endless band B travels around said wheel, contacting with the wheel and also contacting with the rollers C and E which retain their position relatively to the axle of the wheel. It will also be seen that the point of intersection of the axes of the ellipse is substantially coincident with the center of the wheel.

Having now described my invention what I claim and desire to secure by Letters Patent of the United States is:—

The combination with a vehicle wheel of an endless band arranged in the plane of the wheel and adapted to travel around the same in contact with the wheel and with the ground, the clamps secured to the axle bearing of the wheel, brackets pivoted to said clamp, a spring connecting the brackets, and guides on the brackets engaging the band and serving to distend the band into approximately elliptical form and to maintain the band in the plane of the wheel.

In testimony whereof I have signed my name to this specification in the presence of two subscribing witnesses.

SEVERO CAMPO FREGOSO.

Witnesses:
  JOHN MCCLEARY,
  THOMAS BISHOP GRAISEA.